United States Patent [19]

Olson

[11] Patent Number: 5,725,629
[45] Date of Patent: *Mar. 10, 1998

[54] GUIDE RING FOR I.S. GLASS FORMING MACHINE

[75] Inventor: Dudley T. Olson, Toledo, Ohio

[73] Assignee: Owens-Brockway Glass Container Inc., Toledo, Ohio

[*] Notice: The term of this patent shall not extend beyond the expiration date of Pat. No. 5,609,664.

[21] Appl. No.: 783,587

[22] Filed: Jan. 13, 1997

Related U.S. Application Data

[63] Continuation of Ser. No. 446,889, May 17, 1995, Pat. No. 5,609,664.
[51] Int. Cl.$^6$ ............................... C03B 11/06; C03B 9/00
[52] U.S. Cl. ............... 65/361; 65/362; 65/170; 65/172; 65/374.15; 65/374.12; 425/525; 425/529
[58] Field of Search ............ 65/374.15, 374.11, 65/374.12, 170, 171, 172, 207, 223, 226, 235, 236, 300, 305, 307, 321, 323, 357, 359, 360, 361, 362; 425/525, 529; 264/532, 535

[56] References Cited

U.S. PATENT DOCUMENTS

| | | | |
|---|---|---|---|
| 3,424,569 | 1/1969 | Huebner | 65/374.12 |
| 3,573,025 | 3/1971 | Hamilton | 65/307 |
| 4,191,548 | 3/1980 | Fortner et al. | 65/235 |
| 4,436,543 | 3/1984 | Kasten | 65/172 |
| 4,576,624 | 3/1986 | Seidel | 65/300 |
| 4,662,928 | 5/1987 | Dauer | 65/236 |
| 4,888,040 | 12/1989 | Douglas et al. | 65/307 |
| 4,950,321 | 8/1990 | DiFrank | 65/374.11 |
| 5,120,341 | 6/1992 | Nozawa et al. | 65/374.15 |
| 5,609,664 | 3/1997 | Olson | 65/374.15 |

Primary Examiner—Steven P. Griffin

[57] ABSTRACT

A self-lubricating ring assembly (10) for use in forming a finish portion (F) of a hollow formable glass parison (P), the neck ring assembly (10) having an opposed pair of part cylindrical metallic neck ring sections (22a, 22b) that can be opened and closed with respect to one another. The opening and closing of the neck ring sections is guided by a guide ring assembly (24) that is made up of a larger diameter flange member (26) and a smaller diameter hub member (28) that is coaxially and removably joined to the flange member (26). A peripheral portion of the flange member (26) is slidably received in a slot that is defined by opposed slot portions (30, 30b) of the neck ring sections (22a, 22b). The flange member (26) of the guide ring assembly (24) is formed of graphite, to eliminate the need for external lubrication of the neck ring assembly (10), and the hub member (28) is formed of a hardened metal alloy.

8 Claims, 2 Drawing Sheets

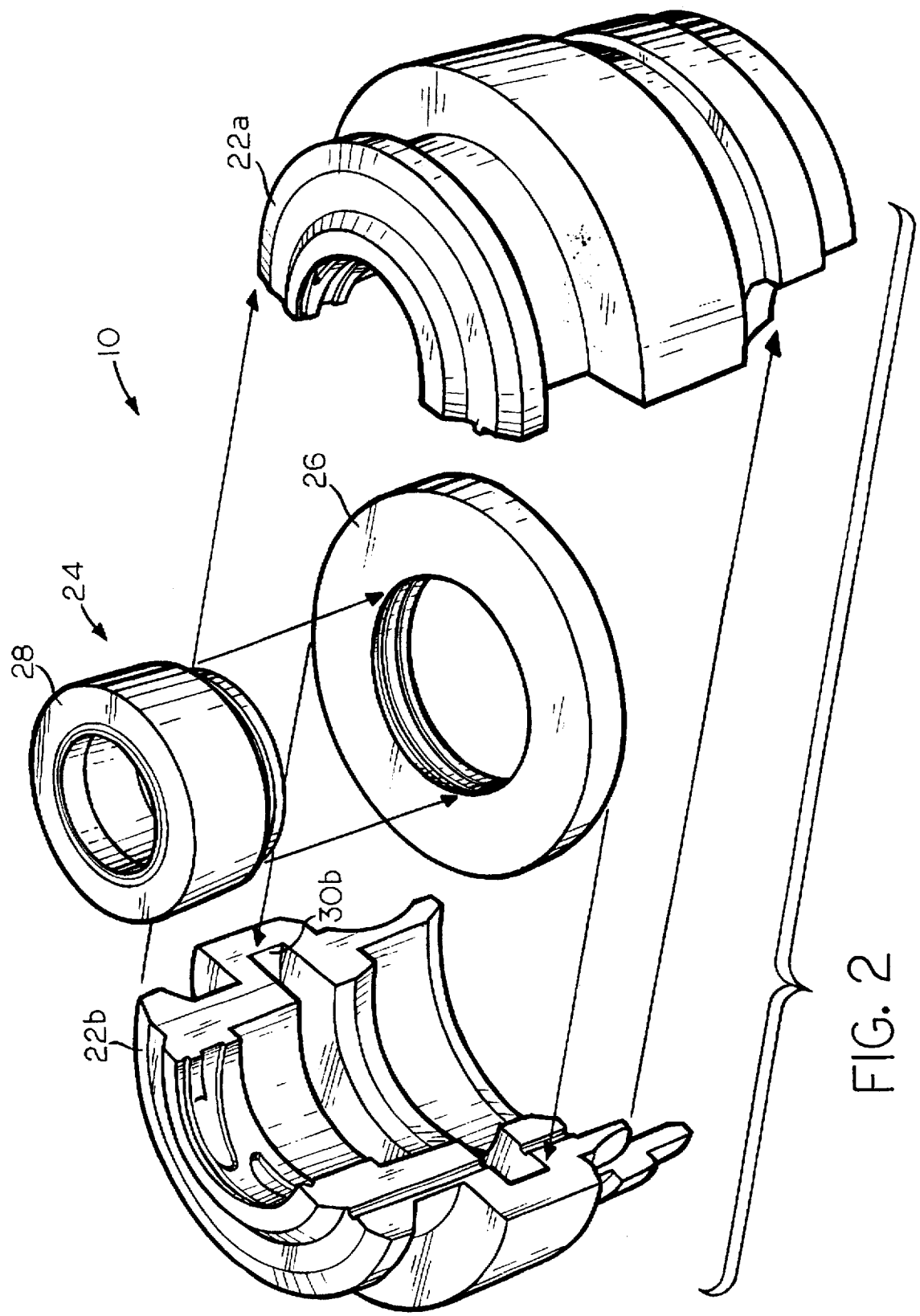

GUIDE RING FOR I.S. GLASS FORMING MACHINE

This is a continuation division of application Ser. No. 08/446,889, filed May 17, 1995, now U.S. Pat. No. 5,609,664.

FIELD OF THE INVENTION

This invention relates to a guide ring for use with a pair of finish forming neck ring segments in a glass container forming machine of the individual section (I.S.) type.

BACKGROUND OF THE INVENTION

A glass container forming machine of the I.S. type forms a glass container at a section of a multiple section machine in a two-step operation. In the first step, a hollow preform of the finished container, which is usually called a parison or blank, is formed from molten glass by blowing or pressing a gob of glass within a suitable mold, and the parison is usually formed in an inverted orientation, that is, with its open end down. The parison is then transferred by an inverting mechanism, which is rotated through an arc of 180°, to a blow mold station where the parison is blown, within the confines of a suitable mold, to its final configuration.

The finish portion of the container, that is, the portion of the container surrounding its open end, which is threaded or otherwise configured to permit a closure to be secured to the container, is formed by a neck ring assembly. The neck ring assembly is made up of a pair of 180° ring sections that collectively fully surround the portion of the container being formed that is to be its finish, and the neck ring assembly is carried by the invert arm and travels with the parison as it is transferred from the blank mold to the blow mold. The neck ring sections are able to separate with respect to one another to permit a container to be withdrawn therefrom, and then to close with respect to one another in a circumferential pattern to form a finish in the next parison to be processed therethrough.

The opening and closing of the neck ring sections with respect to one another are guided by a circumferentially continuous ring, called a guide ring, that is received in a slot in the neck ring assembly which is defined by mating slot portions of the neck ring sections. A typical guide ring has a flange section that has a relatively large diameter, but is relatively thin in an axial direction, and a small diameter hub extending from the flange section, which is relatively thick in its axial direction. Heretofore, it was customary to fabricate such guide rings as single pieces from a hardened steel alloy.

The flange of a steel guide ring, as heretofore described, is slidably received in the mating slot portions of the neck ring sections and must be periodically lubricated to permit the required relative sliding motion between the guide ring and the neck ring sections as the neck ring sections open and close with respect to one another. Heretofore, it was customary to provide such lubrication by having the forming machine operator periodically, e.g., every 15 minutes, swab the neck rings with a liquid suspension of graphite particles. However, the liquid swabbing procedure heretofore employed in lubricating I.S. forming machine neck rings, as described above, has a number of disadvantages.

SUMMARY OF THE INVENTION

In accordance with the present invention there is provided a neck ring assembly for an I.S. machine that is self-lubricating and is free from the requirement that it be periodically lubricated from an external location, by swabbing with a suspension of graphite particles or otherwise. The neck ring assembly according to the present invention comprises, in addition to a mating pair of neck ring sections that may otherwise be of conventional construction, a circumferentially endless guide ring of two-piece construction. The guide ring of the present invention is made up of a relatively large diameter annular graphite flange member, and a co-axial small diameter hub member that is removably secured to the flange member, the hub member being somewhat longer in its axial extent than the flange member. The graphite flange member is self-lubricating with respect to the mating neck ring sections, by virtue of its graphite construction, thus eliminating the need for periodically swabbing or otherwise lubricating the neck rings during a production run. Further, by virtue of the removable attachment between the metallic hub portion and the graphite flange portion of the guide ring, the flange portion may be readily replaced if it becomes excessively worn, without the need to replace the hub portion.

Accordingly, it is an object of the present invention to provide an improved neck ring assembly for a glass forming machine. More particularly, it is an object of the present invention to provide a neck ring assembly for a glass forming machine which is self-lubricating in operation.

It is also an object of the present invention to provide an improved guide ring for a neck ring assembly for a glass forming machine. More particularly, it is an object of the present invention to provide a guide ring for a neck ring assembly for a glass forming machine, the guide ring having a replaceable element that imparts self-lubricating properties to the neck ring assembly.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 2 is an exploded, perspective view of the neck ring assembly of FIG. 1.

DETAILED DESCRIPTION OF THE PREFERRED EMBODIMENT

Figure 1:
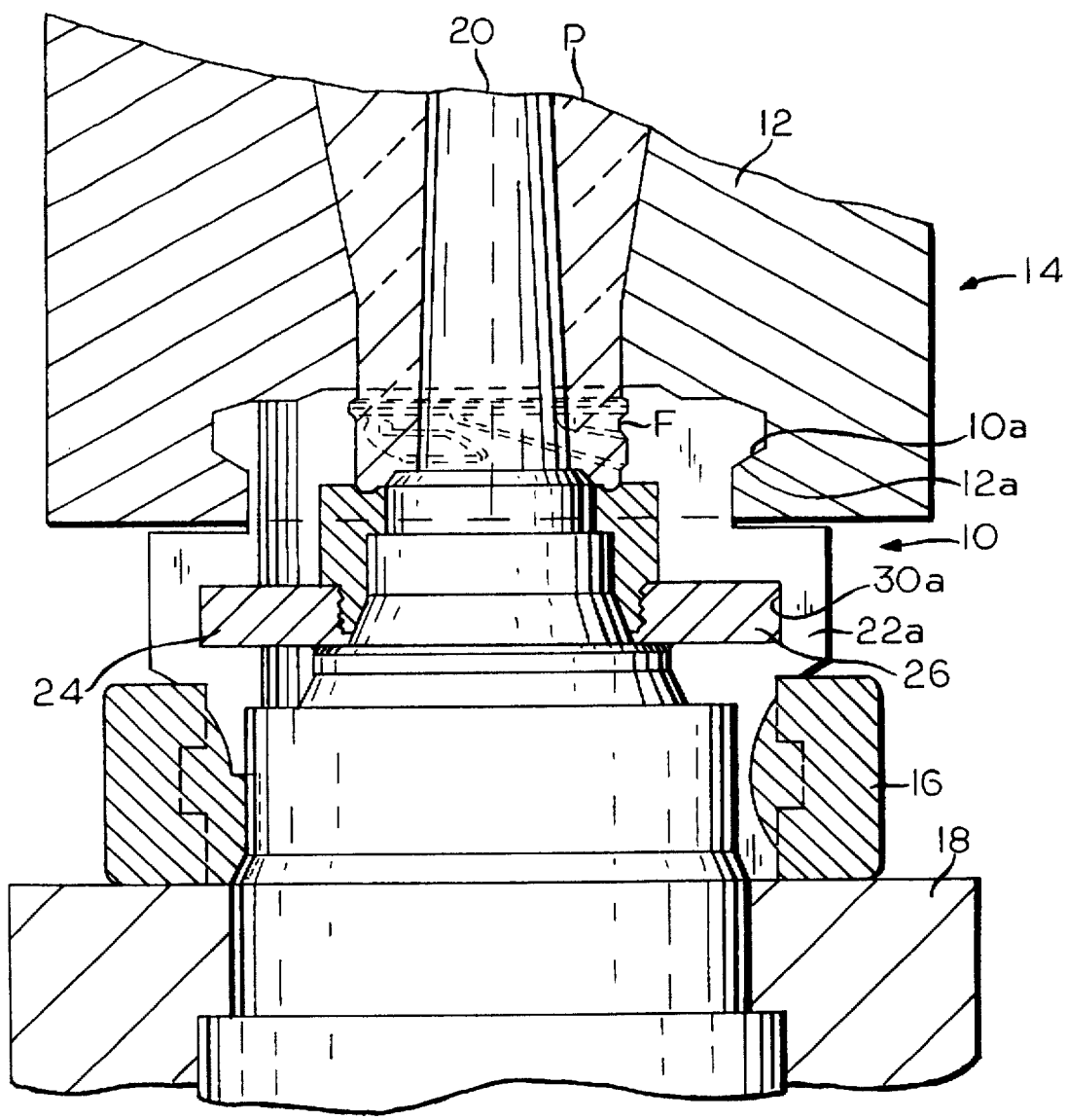
FIG. 1 is a fragmentary view, partly in cross-section, of an I.S. machine blank mold station incorporating a neck ring assembly according to the preferred embodiment of the present invention.

A neck ring assembly according to the preferred embodiment of the present invention is indicated generally by reference numeral 10 in the drawing. The neck ring assembly 10 is shown in FIG. 1 in its operating position in a glass container forming process in conjunction with a blank mold 12 at a parison forming station, indicated generally by reference numeral 14, of a glass container forming machine of the I.S. type.

The body portion of a glass container parison P is formed in the blank mold 12 of the parison forming station 14, and a "finish" portion of the parison P, that is, the threaded or otherwise configured open end portion F of the parison P, is formed at the parison forming station by the neck ring assembly 10. In that regard, the neck ring assembly 10 has a radially outwardly projecting flange 10a, which is received in a corresponding slot 12a of the blank mold 12, it being understood that the blank mold 12 is constructed of mating, semi-cylindrical mold sections that are capable of being separated after the formation of the parison P to permit the neck ring assembly 10 and the blank mold 12 to be separated from one another.

After the forming of the parison P, the neck ring assembly 10, which is carried by an invert arm 16, is separated from the blank mold 12 to transfer the parison P, by an inverting or 180° turning operation, to a container forming mold (not shown) where the parison P, which is still at a suitably high forming temperature, is blown into a finished container. In any event, the invert arm 16 is supported at the parison forming station 14 by supporting it at a portion 18 of the fixed structure or frame of the glass forming machine, and a plunger 20 is reciprocated with respect to the frame 18, the invert arm 16, the neck ring assembly 10 and the blank mold 12 to form a hollow interior portion in the parison P, it being understood that the plunger 20 is retracted from its Fig. 1 position to permit the parison P to be transferred to a container forming station. Alternatively, the interior of the parison can be formed by blowing, in a process known as the "blow and blow" process, the process illustrated in FIG. 1 being known as the "press and blow" process.

The neck ring assembly 10 is made up of mating, semi-cylindrical neck ring portions 22a, 22b, only one of which, the neck ring section 22a, is illustrated in FIG. 1. The neck ring sections 22a, 22b are positioned end to end with respect to one another during a molding operation to form a substantially continuous finish molding chamber, but are separable with respect to one another to permit a finished container to be withdrawn therefrom. In the opening and closing of the neck sections 22a, 22b with respect to one another, they are guided by a guide ring assembly 24, which is made up of a larger diameter, annular flange member 26 and a smaller diameter coaxial annular hub member 28, which is removably secured to the interior of the flange member 26 by a threaded connection. The peripheral portion of the flange member 26 is slidably received in opposed recesses 30a, 30b of the neck ring sections 22a, 22b, respectively, and sliding contact occurs between the flange member 26 of the guide ring assembly 24 and the slots 30a, 30b during the opening and closing of the neck ring sections 22a, 22b with respect to one another. In that regard, the opposed recesses 30a, 30b form a substantially continuous annular slot for the neck ring sections 22a, 22b which are disposed in end to end relationship. In any case, the neck ring sections 22a, 22b may be of conventional construction, that is, machined from a temperature resistant metal of good thermal conductivity such as an aluminum bronze alloy.

The flange member 26 of the guide ring assembly 24 is machined from graphite, to provide lubricity for the sliding motion of the neck ring sections 22a, 22b with respect to one another during the opening and closing thereof. The hub member 28 of the guide ring assembly 24, on the other hand, need not have self-lubricating properties corresponding to those of the flange member 26, and may be, and preferably is, formed from a hardened metal alloy such as a hardened steel alloy to be resistant to possible impact damage occurring during the reciprocation of the plunger 20 with respect thereto, as heretofore described. In that regard, the internal diameter of the member 28 is smaller than the internal diameter of the flange member 26, so that any impact occurring between the plunger 20 and the guide ring assembly 24 will occur between the plunger 20 and the hub member 28, which is sufficiently hard to resist damage from any such impact, as opposed to contact between the plunger 20 and the flange member 26, which is not as resistant to impact damage because of its graphite construction.

The use of two members in the construction of the guide ring assembly 24, namely the flange member 26 and the hub member 28, permits ready replacement of the flange member 26, which is more subject to wear during a glass container production run than the hub member 28, so that the entire guide ring assembly 24 need not be replaced at the end of the useful life of the hub member 28. While a threaded connection between the hub member 28 and the flange member 26 has been illustrated and described, other forms of removable attachment of the hub member 28 and the flange member 26 to one another, such as a bayonet connection, are contemplated.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed:

1. A self-lubricating neck ring assembly for a glass forming machine comprising:

a plurality of neck ring sections, each of said neck ring sections having an opposed pair of ends, said neck ring sections being capable of being positioned end to end to form a substantially continuous mold to from a finish portion of a hollow glass article, said neck ring sections being separable from one another to permit the hollow glass article to be withdrawn therefrom, each of said sections having a slot therein, said slots of said plurality of sections forming a substantially continuous annular slot when said neck ring sections are positioned in end to end alignment; and a guide ring assembly, said guide ring assembly comprising a larger diameter annular flange member and a smaller diameter annular hub member, said hub member extending coaxially from said flange member and being removably joined to said flange member, said flange member being formed of graphite and being slidably received in said slots of said neck ring sections to guide said neck ring sections as they open and close with respect to one another.

2. A neck ring assembly according to claim 1 wherein said annular hub member is formed from a hardened metal alloy.

3. A neck ring assembly according to claim 2 wherein said hub member has an internal diameter and wherein said flange member has an internal diameter, the internal diameter of the hub member being smaller than the internal diameter of the flange member, whereby any contact between a plunger element of the glass forming machine with which such neck ring assembly is used will be between the plunger element and the hub member.

4. A neck ring assembly according to claim 1 wherein each of said neck ring sections is formed of a heat resistant metal with good thermal conductivity.

5. A neck ring assembly according to claim 4 wherein said heat resistant metal is an aluminum bronze alloy.

6. A guide ring assembly for use in a neck ring assembly for a glass forming machine, said guide ring assembly not requiring lubrication from an external source and comprising:

an annular flange member, said annular flange member being adapted to be slidably received in an annular slot defined by a plurality of aligned slots in a plurality of neck ring sections, the neck ring sections being capable of opening and closing with respect to one another, said flange member being formed of graphite; and an annular hub member, said hub member having an outside diameter that is smaller than an outside diameter of said flange member, said annular hub member extending coaxially from said annular flange member, said flange member being removably joined to said hub member.

7. A guide ring assembly according to claim 6 wherein said annular hub member is formed from a hardened metal alloy.

8. A guide ring assembly according to claim 7 wherein said hub member has an internal diameter and wherein said flange member has an internal diameter, the internal diameter of the hub member being smaller than the internal diameter of the flange member, whereby any contact between a plunger element of the glass forming machine with which such guide ring assembly is used will be between the plunger element and the hub member.

* * * * *